Oct. 18, 1927.
J. T. STONEY
1,645,828
AUTOMATIC VALVE MECHANISM
Filed Nov. 24, 1924
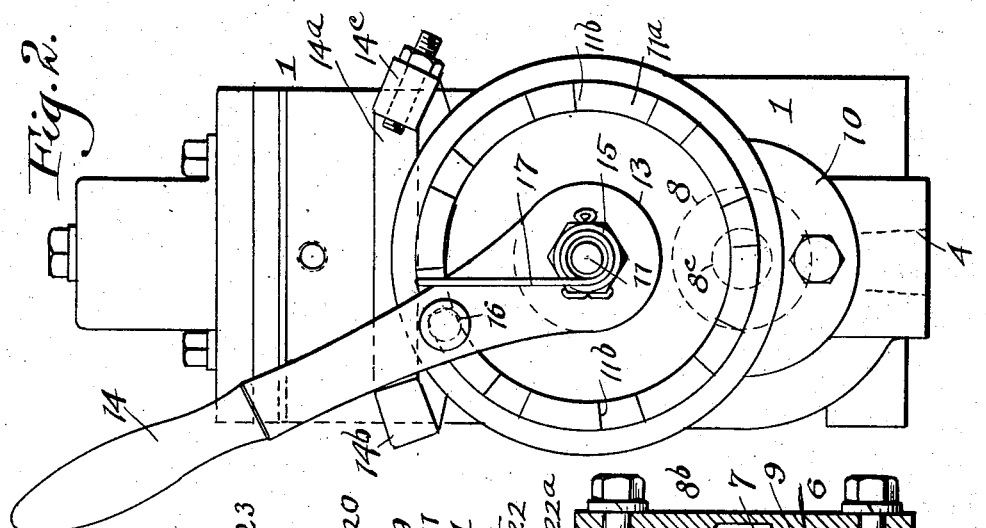
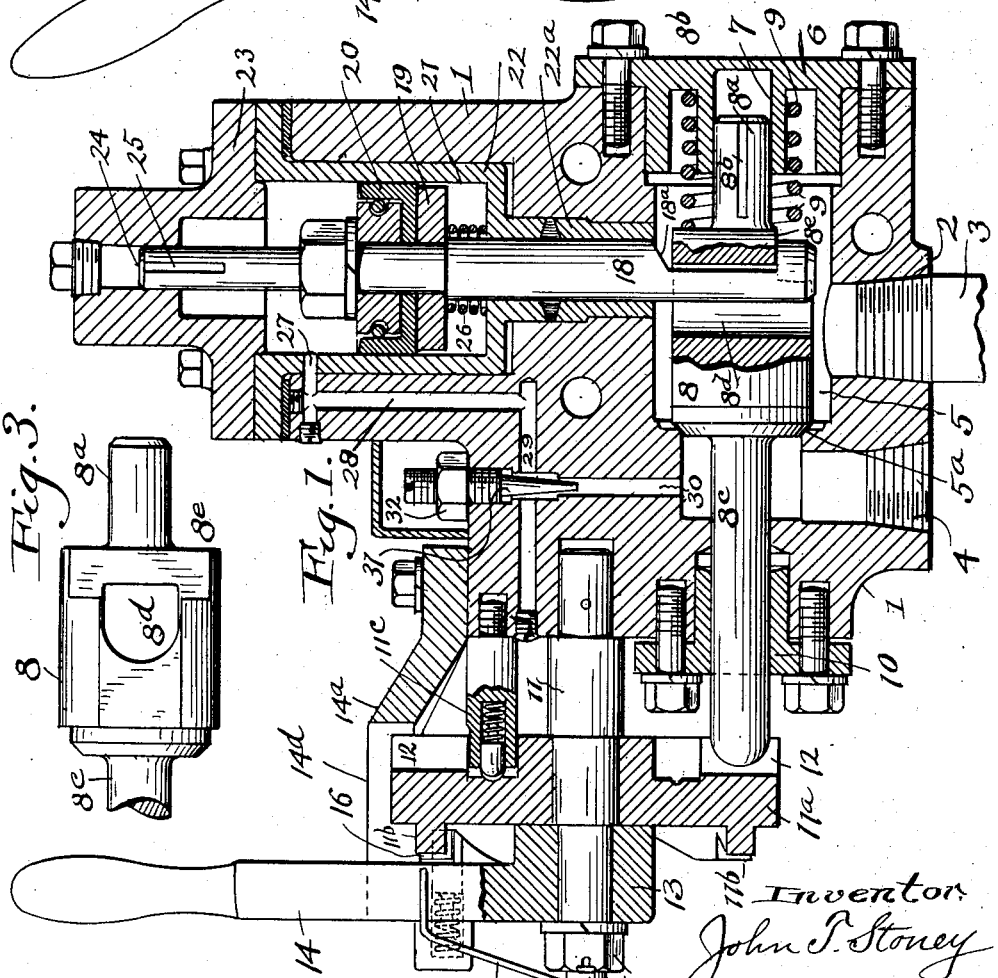
Inventor
John T. Stoney
Thurston Rivers & Hudson
attys.

Patented Oct. 18, 1927.

1,645,828

UNITED STATES PATENT OFFICE.

JOHN T. STONEY, OF CLEVELAND, OHIO.

AUTOMATIC VALVE MECHANISM.

Application filed November 24, 1924. Serial No. 751,883.

This invention relates to a valve mechanism for use in connection with pressure air lines for controlling passage of air through such lines.

One of the objects of the invention is to provide a valve mechanism in which the part controlling the passage of air may be opened and maintained in its open position through a definite interval of time.

A further object of the invention is to provide air operated means which retains the part that controls the passage of air, in its open position and automatically releases it to allow it to close at the expiration of a definite interval of time.

A still further object is to provide a structure such as has been defined in which the air operated means is directly connected with the air line and the passage of air to the air controlling means is itself controlled so as to permit the building up of air pressure behind the air operated means through a given interval of time.

Reference should be had to the accompanying drawings forming a part of this specification, in which Fig. 1 is a sectional elevation of the valve mechanism embodying the present invention; Fig. 2 is an end elevation; Fig. 3 is a top plan view of a portion of the main controlling valve.

Referring to the drawings, the body of the valve mechanism is generally indicated at 1, and at its lower part is provided with an opening 2 adapted to receive a pipe 3 which pipe may be the pressure air line with which the valve is used. There is also an outlet 4 to which is connected the air line passing to the device to which the compressed air is to be supplied.

The body of the mechanism proper is provided with a chamber 5 which may be closed by means of a cover plate 6 suitably bolted and held in place, and which cover plate is provided with an inwardly projecting cylindrical wall 7 to provide a guiding bar for a portion of the main control valve.

Within the chamber 5 there is a seat 5ª against which operates a main control valve 8, a portion of such valve being suitably prepared to co-operate with the seat 5ª to make a tight closure. The main valve 8 has a rearward projection 8ª which co-operates with the cylindrical wall 7 before described, and preferably there will be a splined connection between the projection 8ª and the cylindrical wall 7 as indicated at 8ᵇ in Fig. 1.

There is also a spring 9 which surrounds the projection 8 bearing against the end of the body portion of the main valve 8, and also surrounding the cylindrical wall 7 and bearing against the plate 6. Obviously this spring 9 urges the main valve 8 towards its closed or seated position.

There is a forward extension 8ᶜ which is connected with the main controlling valve 8. It extends through an opening in a portion of the body 1 and through a packing nut 10 which is suitably secured in the body 1 of the valve. The projection 8ᶜ extends beyond the packing nut in position to be engaged operatively by mechanism which is about to be described.

Secured in the body portion of the valve is a stub shaft 11. This is nonrotatably secured in the body portion. Upon a portion of this shaft there is mounted for free rotation a member 11ª. This member upon its inner surface has a series of projections 12 which are in position to engage with the extension 8ᶜ of the main valve 8 when the member 11ª is turned.

For the purpose of preventing over running of the member 11ª a spring-pressed detent 11ᶜ is provided which is mounted in the body portion 1 of the valve and extends into contact with portions of the member 11ª. Upon the stub shaft 11 there is also mounted the hub 13 of a handle 14. This hub is free to turn upon the stub shaft 11 and is held in proper position by means of a nut 15 or any other suitable means. For the purpose of defining the range of movement of the handle 14 a yoke-like member 14ª is secured upon the body of the valve and has arms 14ᵇ and 14ᶜ between which arms the movement of the handle 14 may be effected.

From the foregoing it will be understood that the member 11ª and the hub 13 may have relative movement upon the stub shaft 11.

The surface of the member 11ª which is adjacent the handle is provided with a series of ratchet projections such as indicated at 11ᵇ, and the handle 14 carries a spring pressed pawl which is indicated at 16, the pawl being chamfered upon one face so that it may engage with any one of the projections 11ᵇ to move the member 11ª in one direction but will freely ride over such projections in the reverse movement of the handle. The handle 14 is controlled by a spring such as indicated at 17 so that when the handle has been moved in a direction to actuate the member 11ª, release of the handle 14 will under the springs 17 return the handle to its initial position.

It will be apparent that when the handle 14 is operated it will cause rotation of the member 13 and this rotation of the member 11ª will cause one of the projections 12 to engage with the extension 8ᶜ on the main valve 8, and push it inwardly. This will then connect the air inlet opening 2 with the air exit opening 4 permitting the passage of air during the time that the valve 8 is open.

It should be noted that the projections 12 on the member 11ª are of such dimension with respect to the angular movement of the member 11ª that a projection 12 will engage the extension 8ᶜ on the valve 8, moving the valve and then the projection 12 will move beyond the extension 8ᶜ so that the valve may return to its seat under action of the spring 9, except that as will be presently described mechanism is provided for retaining the valve 8 in its open position for a definite period of time.

It will be noted that the main valve 8 is provided with an opening which extends transversely through the valve as indicated at 8ᵈ, and further it will be noted that at the end of the valve body 8, which is adjacent the spring 9, it is notched out as indicated at 8ᵉ. The purpose of this is for co-operation with what may be termed a latch member 18. This latch member at its lower end has a notched out portion 18ª which is of such extent that it may cooperate with the rear wall portion of the slot 8ᵈ which is formed in the member 8 so that the lower portion of the latch member 18 may engage beneath the wall formed by the notched out part 8ᵉ in the valve 8. The purpose of this construction is to prevent the upward rise of the latch 18 except at such time as the main valve 8 has been moved to open position.

The latch member 18 is pneumatically operated, and for this purpose there is attached to the latch member 18 a piston 19 which is suitably packed as indicated at 20, and this piston occupies a recessed portion 21 which is formed in the body of the valve and is suitably lined by a member 22 which has an extension 22ª through which the latch member 18 extends. The recess 21 formed in the body member 1 is closed by a suitable cover plate 23, and the end of the latch member 18 extends into an opening 24 which is formed in the cover plate 23 so as to guide the movement of the latch member. There is a splined connection such as indicated at 25 between the end of the latch member 18 and the cover 23. Beneath the piston 19 there is a spring 26 which is a light spring, and has a tendency to push the piston upwardly under conditions which will be later described.

The chamber which is behind the piston 19 is connected by a suitable air passage with a chamber which is adjacent the air outlet opening of the valve structure. For ease of manufacturing this air connection is made up of the passageways 27, 28, 29 and 30, and the passage of air is controlled by a needle valve 31 which may be retained in a definite position by means of a lock nut 32. Thus it will be seen that when the main air valve is open the air under pressure which is admitted through the inlet opening 2 will find in part passageway through the passages marked 30, 29, 28 and 27, to the chamber behind the piston 19, and will there build up a pressure behind the piston which will tend to move the piston and the latch member 18.

The operation of the valve is as follows:

It will be noted that the line pressure of the air is always operative within the chamber in which the main valve 8 is located, so that there is beneath the end of the latch member 18 full air line pressure which is tending to move it upwardly, but such movement is restrained due to the latching effect between the member 18 and the valve 8.

When the handle 14 is moved it will cause movement of the member 11 which will in turn cause one of the projections 12 to engage with the extension 8ᶜ on the valve 8 and move it to unseat the main valve 8. As this is done the combined action of the air pressure on the end of the latch 18 and the spring 26 will cause the latch member 18 together with the piston 19 to be raised and the lower portion of the latch will occupy the recess or slot 8ᵈ formed in the member 8, and retain the valve 8 in open position even against the action of the spring 9 so long as the latch 18 is in raised position.

As soon as the main valve 8 is open the air under pressure will be admitted to the passageways 30, 29, 28, 27, into the chamber behind the piston 19, and as before stated, pressure will build up behind the piston 19. The seating of the needle valve 31 will control the passage of air beyond the passageway 30 so that by adjustment of the needle valve 31 a desired time interval may be obtained before sufficient pressure will have built up behind the piston 19 to cause movement of the piston and the latch 18 carried thereby to such position that the latch will release the valve 18 and permit its closure under action of the spring 9.

As just stated, manipulation of the needle valve 31 will control the time interval in which the main valve 8 is held in open position.

It will be obvious that as soon as the main valve 8 is closed then the air behind the piston 19 may exhaust itself through the passageways 27, 28, 29 and 30, and through the outlet opening 4.

From the foregoing description it will be seen that the closing action of the valve is entirely automatic, and all that is required of the operator is to move the lever 14 to start the opening operation of the valve, and from that on the valve is automatically maintained in its open position through a period of time and then automatically closed.

Having described my invention, I claim:—

1. A valve mechanism comprising a casing, a chambered portion in said casing, an inlet and an outlet connected with said chambered portion, a valve proper within the chambered portion, a seat between the inlet and outlet openings with which the valve proper co-operates, means for normally moving the valve to closed position, means for moving the valve to open position, a latch member extending into said chambered portion and adapted to engage the valve member and hold the valve member in open position, means operating automatically upon the opening of said valve for shifting said latch to its valve holding position, fluid pressure operated means for moving the latch to release the valve, a conduit connecting the fluid pressure operated means for the latch with the chambered portion within the valve casing at a point beyond the valve seat.

2. A valve mechanism comprising a casing, a chambered portion in said casing, an inlet and an outlet connected with said chambered portion, a valve proper within the chambered portion, a seat between the inlet and outlet openings with which the valve proper co-operates, means for normally moving the valve to closed position, means for moving the valve to open position, a latch member extending into said chambered portion and adapted to engage the valve member and hold the valve member in open position, means operating automatically upon the opening of said valve for shifting said latch to its valve holding position, fluid pressure operated means for moving the latch to release the valve, a conduit connecting the fluid pressure operated means for the latch with the chambered portion within the valve casing at a point beyond the valve seat, and means for controlling the passage of fluid through the said conduit.

3. A valve mechanism comprising a casing, a chamber within the casing, an inlet and an outlet communicating with the chamber, a valve proper within the chamber, a seat within said chamber with which the valve proper co-operates, means normally urging the valve toward closed position, means for moving the valve proper to open position, a latch member adapted to engage the valve to hold it in open position, a portion of said latch mechanism being subject to fluid pressure to move the latch to operative position when the valve proper is open, a fluid operated mechanism connected with the latch for the purpose of moving the latch to its releasing position, a conduit connecting the fluid operating mechanism with the chamber within the valve casing at a point beyond the seat thereof and adjacent the outlet opening, and valve means for controlling the passage of fluid through said conduit.

4. A valve mechanism comprising a casing, a chambered portion within said casing, an inlet and an outlet communicating with said chamber, a valve proper within the chamber, a seat within the chamber with which the valve proper co-operates, means normally urging the valve proper to closed position, means for moving the valve proper to open position, a latch member having a notched out portion said valve proper being provided with a slotted opening through which the latch member extends, the notched out portion of the latch member engaging with a portion of the valve proper to prevent movement of the latch member, a piston operatively connected with the latch member, a chambered portion in the valve casing in which the piston is housed, a conduit connecting the said chamber at a portion behind the piston with the chambered portion in which the valve proper is housed and at a point beyond the valve seat and adjacent the outlet opening, a valve mechanism for controlling the passage of fluid through said conduit.

5. A valve mechanism comprising a casing having a chambered opening, an inlet and an outlet passageway connected with said chambered portion, a valve proper within the chambered portion, a seat with which the valve proper co-operates, resilient means normally urging the valve to its closed position, means for moving said valve proper to its open position said valve proper being provided with an opening transversely thereof, a latch member mounted for sliding movement in a portion of said valve casing said latch member extending into the opening in the valve proper said latch member having a portion which is within the chambered portion and subject to pressure of fluid that may be within said chamber the said latch member and the said valve proper having co-operating shoulders which prevent movement of the latch member until the said valve proper is moved to open position, a piston operatively connected with said latch, a second chambered portion in the valve casing in which the piston is housed, a conduit connecting said chambered portion behind the piston with the first mentioned chambered portion beyond the seat and adjacent the outlet opening, and means for controlling the passage of fluid through said conduit.

6. A valve mechanism comprising a casing, a chambered portion within the casing, an inlet and an outlet passage connected with said chambered portion, a movable valve proper within said casing, a seat with which said valve proper co-operates, means normally urging the valve proper to closed position, said valve proper having a part that extends without the casing, a member supported for rotation, said member being provided with projections which are adapted to engage with the extension on the valve proper to move said valve proper to open position, a movable handle mounted concentrically with said last mentioned member, co-operating means upon said handle and said member for moving the member to thereby operate the valve to move the same to open position.

7. A valve mechanism comprising a casing, a chambered portion within the casing, an inlet and an outlet passage connected with said chambered portion, a movable valve proper within said casing, a seat with which said valve proper co-operates, means normally urging the valve proper to closed position, said valve proper having a part that extends without the casing, a member supported for rotation, said member being provided with projections which are adapted to engage with the extension on the valve proper to move said valve proper to open position, a movable handle mounted concentrically with said last mentioned member, co-operating means upon said handle and said member for moving the member to thereby operate the valve to move the same to open position, spring means for returning the handle to initial position, and detent means for holding said member against reverse rotation.

8. A valve mechanism comprising a casing, a chambered portion in said casing, an inlet and an outlet connected with said chambered portion, a valve within the chambered portion, a seat with which the valve cooperates, means for normally moving the valve to closed position, means for moving the valve to open position, a latch member extending into said chambered portion and adapted to engage the valve and hold the valve in open position, means operating automatically upon the opening of said valve for shifting said latch member to its valve holding position, fluid pressure operated means for moving the latch member to release the valve, and means for admitting fluid under pressure to said fluid pressure operated means upon the opening of the valve to operate the latch member.

9. A valve mechanism comprising a casing, a chambered portion in said casing, an inlet and an outlet connected with said chambered portion, a valve within the chambered portion, a seat with which the valve cooperates, means for normally moving the valve to closed position, means for moving the valve to open position, a latch member extending into said chambered portion and adapted to engage the valve and hold the valve in open position, means operating automatically upon the opening of said valve for shifting said latch member to its valve holding position, fluid pressure operated means for moving the latch member to release the valve, and means for establishing communication between said fluid pressure operated means and said chambered portion upon the opening of the valve to actuate said latch member.

10. A valve mechanism for opening and closing a passage for fluid under pressure comprising a movable valve which is biased toward its closed position, means for opening the valve, a movable latch engaging the valve, said latch and valve having interengaging parts coacting to hold the latch against movement when the valve is closed and the valve against movement when the same is open, said latch being biased toward its valve holding position, a pressure chamber, a member connected to the latch which is subjected to the pressure in said chamber and is adapted to be moved thereby to shift the latch to valve releasing position, and means for admitting pressure to said chamber when the valve is opened and for exhausting pressure from said chamber upon the closing of said valve.

11. A valve mechanism for opening and closing a passage for fluid under pressure comprising a movable valve which is biased toward its closed position, means for opening the valve, a movable latch engaging the valve, said latch and valve having interengaging parts coacting to hold the latch against movement when the valve is closed and the valve against movement when the same is open, said latch being biased toward its valve holding position, a pressure chamber, a member connected to the latch which is subjected to the pressure in said chamber and is adapted to be moved thereby to shift the latch to valve releasing position, means for admitting pressure to said chamber when the valve is opened and for exhausting pressure from said chamber upon the closing of said valve, and means for varying the rate of flow of fluid to said chamber to vary the time interval between the opening and closing of said valve.

12. A valve mechanism for opening and closing a passage for fluid under pressure comprising a valve chamber in said passage having an inlet and an outlet, a valve movable in said chamber to open and close the passage between the inlet and outlet, said valve being biased toward closed position, means for opening the valve, an auxiliary pressure chamber communicating with the passage on the outlet side of the valve, a longitudinally movable latch member engaging said valve, said latch member and valve having interengaging parts coacting to hold the latch member against movement when the valve is closed and the valve against movement when the same is open, said latch member having one end portion thereof subjected to the pressure in the passage on the inlet side of the valve and the other end portion subjected to the pressure in said auxiliary chamber, the pressure in said passage serving to move the latch member toward valve holding position and the pressure in said auxiliary chamber to move the latch member to releasing position.

In testimony whereof, I hereunto affix my signature.

JOHN T. STONEY.